No. 688,924. Patented Dec. 17, 1901.
G. W. BLAIR & H. J. HAYS.
METHOD OF MANUFACTURING HOLLOW GLASS ARTICLES.
(Application filed Dec. 6, 1897.)

(No Model.) 2 Sheets—Sheet 1.

WITNESSES:
F. E. Harpell
G. B. Blemming

INVENTORS:
George W. Blair
Harry J. Hays
by James K. Bakewell
their Attorney

No. 688,924. Patented Dec. 17, 1901.
G. W. BLAIR & H. J. HAYS.
METHOD OF MANUFACTURING HOLLOW GLASS ARTICLES.
(Application filed Dec. 6, 1897.)
(No Model.) 2 Sheets—Sheet 2.

WITNESSES:
INVENTORS:

UNITED STATES PATENT OFFICE.

GEORGE W. BLAIR AND HARRY J. HAYS, OF PITTSBURG, PENNSYLVANIA.

METHOD OF MANUFACTURING HOLLOW GLASS ARTICLES.

SPECIFICATION forming part of Letters Patent No. 688,924, dated December 17, 1901.

Application filed December 6, 1897. Serial No. 660,832. (No model.)

*To all whom it may concern:*

Be it known that we, GEORGE W. BLAIR and HARRY J. HAYS, of Pittsburg, in the county of Allegheny and State of Pennsylvania, have invented a new and useful Improvement in Methods for the Manufacture of Hollow Glass Articles, of which the following is a full, clear, and exact description, reference being had to the accompanying drawings, forming part of this specification, in which—

Figure 1:
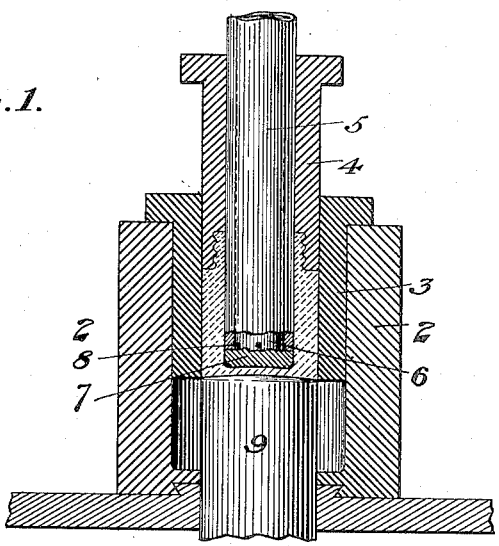
Figure 2:
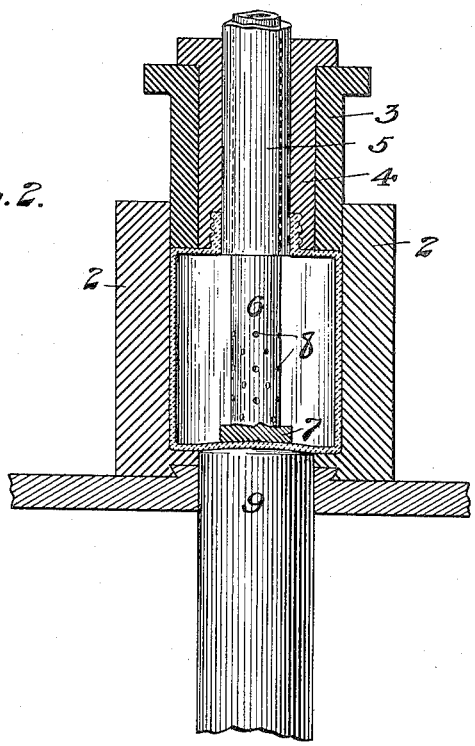

Figure 1 is a vertical sectional view showing apparatus for carrying our invention into effect, the parts being in the position they assume when the pressing of the blank is finished. Fig. 2 is a like view, the parts being in the position they assume when the blowing of the article is completed; and Figs. 3 and 4 are like views of modified form.

In the drawings, 2 represents a two-part press-mold, which may be supported on any suitable frame or table. Inside of the mold 2 is a two-part section 3, which fits in the cavity of the mold 2 and may extend to a point a little more than half the depth of the cavity. Inside the part 3 is a two-part neck-ring 4, that is sufficiently elongated to form a guide for the plunger 5. This plunger is cylindrical in shape, having an inner hollow push rod or pipe 6 fitted telescopically therein, which inner rod is provided with a solid head 7 and perforations 8 for the passage of air, the outer end of the rod 6 being connected with a source of supply of compressed air. Extending from the opposite end of the mold is a rod 9, that acts to close the end of the mold-cavity of the blank-mold 3 and serves either as a yielding support to the glass in the blowing and pressing of the article in the apparatus shown in Figs. 1 and 2 or has the added function of a stretcher for stretching the cylindrical blank in the apparatus shown in Figs. 3 and 4. In this latter case the end of the rod is provided with a cavity 10, into which the plastic glass is either pressed or blown by the plunger 5. The cavity 10 may be dovetailed or provided with a thread, so as to retain the glass that is formed therein and serve as a point of attachment between the glass blank and the rod 9. Although we have shown the mold, plunger, and supporting or stretching rod in a vertical position, we do not desire to limit ourselves thereto.

The operation is as follows: The plunger 5 being raised, a suitable quantity of molten glass is dropped into the mold-cavity. The plunger 5 is then depressed and the glass is forced against the supporting-rod 9 and into the parts of the cavity of the mold. The inner part 3 of the mold and the outer part of the plunger 5 are then withdrawn from contact with the glass blank, and the inner push-rod 6 of the plunger is advanced, pushing and elongating the glass before it, while at the same time the supporting or stretching rod 9 is gradually withdrawn and air is caused to pass through the perforations 8 of the following or advancing rod 6, sufficient in the apparatus shown in Figs. 1 and 2 to expand and elongate the glass into all parts of the mold and in the apparatus shown in Figs. 3 and 4 merely sufficient to prevent the glass blank from collapsing as it is elongated. The blank formed in the mold-cavity has, preferably, relatively thick sides and thin closed end, and as the thin end becomes relatively chilled and hardened the blank is elongated in cylindrical shape by the rod 6, pushing and stretching the glass, and preferably aided by the rod 9, which, as shown in Fig. 2, supports and holds the bottom of the blank and, as shown in Fig. 4, pulls the same also. When the end of the blank is chilled, it causes the force to be exerted on substantially the lines of the outer circumference of the blank, as is described and claimed in an application, Serial No. 659,091, filed by us on the 19th day of November, 1897.

Figure 3:
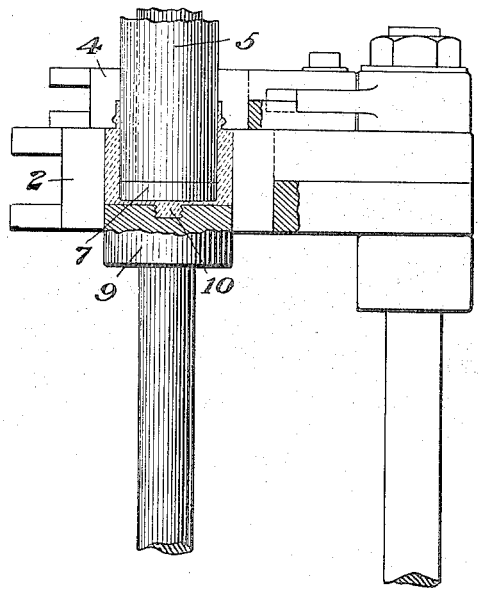
Figure 4:
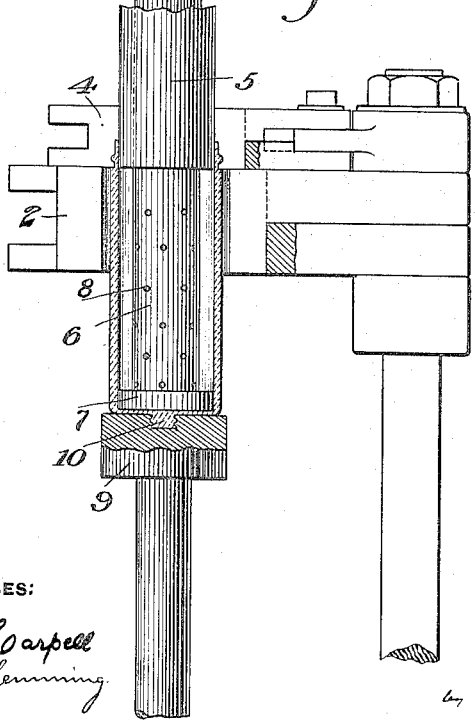

In Fig. 2 we show the operation conducted by expanding the glass blank within the second matrix or mold 2, so as to form a bottle or jar, the bottom of the matrix being constituted by the end of the rod 9, and in Figs. 3 and 4 we show the operation conducted without the second matrix to form a cylinder of window-glass by the conjoined operation of stretching by internal pushing and blowing.

It will be understood that the apparatus of Figs. 1 and 2 may be modified, as the two matrices 3 and 2 need not be telescopically interfitted.

In Figs. 3 and 4 we do not show the part 3; but instead of using the same we free the blank by loosening the mold 2 and then elongate and expand the blank.

The advantages of our invention will be apparent to those skilled in the art, since in the operation of forming hollow articles of glassware uniformity, rapidity, and certainty of operation are obtained.

Although we have described the use of apparatus of definite form, we do not desire to limit ourselves thereto, as a variety of means may be employed for the purpose of carrying our method into effect.

We claim—

1. The method of forming hollow glass articles, which consists in pressing a blank while the molten glass is confined, removing the exterior confinement of the blank, elongating the blank by the application of an interior pushing force other than the expansive force of a fluid, and admitting air to the interior of said blank.

2. The method of forming hollow glass articles, which consists in pressing a blank while the molten glass is confined, removing the exterior confinement of the blank, elongating the blank by the application of an interior pushing force other than the expansive force of a fluid, and expanding the blank.

In testimony whereof we have hereunto set our hands.

GEORGE W. BLAIR.
HARRY J. HAYS.

Witnesses:
F. E. HARPELL,
JAMES K. BAKEWELL.